US00RE37193E

(19) United States
(12) Reissued Patent
Ward, II et al.

(10) Patent Number: US RE37,193 E
(45) Date of Reissued Patent: May 29, 2001

(54) LOW-POWER MULTI-BAY PARKING METER

(75) Inventors: Seth Ward, II; Gary W. Speas, both of Little Rock; R. Todd Brown, Russellville, all of AR (US)

(73) Assignee: POM Incorporated, Russellville, AR (US)

(21) Appl. No.: 09/289,369

(22) Filed: Apr. 8, 1999

Related U.S. Patent Documents

Reissue of:
(64) Patent No.: 5,617,942
Issued: Apr. 8, 1997
Appl. No.: 08/428,771
Filed: Apr. 24, 1995

U.S. Applications:

(60) Continuation-in-part of application No. 08/281,700, filed on Jul. 28, 1994, now Pat. No. 5,475,373, which is a division of application No. 07/864,479, filed on Apr. 7, 1992, now Pat. No. 5,360,095.

(51) Int. Cl.[7] ..... G07F 17/24
(52) U.S. Cl. ..... 194/217; 194/902; 368/90
(58) Field of Search ..... 194/216, 217, 194/218, 219, 240, 241, 242, 900, 902; 368/7, 90

(56) References Cited

U.S. PATENT DOCUMENTS

| | | | | |
|---|---|---|---|---|
| 3,948,375 | * | 4/1976 | Selby, Jr. | 194/216 |
| 4,173,272 | * | 11/1979 | Von Knorring | 194/218 |
| 4,356,903 | * | 11/1982 | Lemelson et al. | 194/217 |
| 4,379,334 | * | 4/1983 | Feagins, Jr. et al. | 368/90 |
| 4,823,928 | * | 4/1989 | Speas | 194/217 |
| 4,876,540 | * | 10/1989 | Berthon et al. | 194/902 |
| 5,109,972 | * | 5/1992 | Van Horn et al. | 194/219 |
| 5,360,095 | * | 11/1994 | Speas | 194/217 |
| 5,454,461 | * | 10/1995 | Jacobs | 368/7 |

FOREIGN PATENT DOCUMENTS

| | | | | |
|---|---|---|---|---|
| 3311993 | * | 10/1994 | (DE) | 368/90 |
| 2077475 | * | 12/1981 | (GB) . | |

OTHER PUBLICATIONS

Telkor, "Parking Meter Revenue into the Electronic Age", Advertisement Brochure, date unknown.*
Harding Electronic Systems, Ltd., "Multipark Parking Meter", Advertisement Brochure, date unknown.*
McKay Meters, Ltd., "The Bay Machine", Advertisement Brochure, date unknown.*
Washington Post, "High–Tech Parking Meters . . . " pp. A1 and A5, Jul. 1988.*
International Parking Systems, Inc. "Bay–Net meter", advertisement brochure, date unknown.*

* cited by examiner

*Primary Examiner*—Robert P. Olszewski
*Assistant Examiner*—Bryan Jaketic
(74) *Attorney, Agent, or Firm*—Groover & Associates PC; Robert Groover; Betty Formby

(57) ABSTRACT

A low power parking meter to control two or four parking bays. A display, either by a flag-wheel or a digital display will normally indicate the status of each bay. When funds are deposited without indicating the bay to be credited, the meter will escrow the amount until a bay is chosen. The meter normally operates in an idle loop unless an individual bay is being checked or vended.

29 Claims, 12 Drawing Sheets

LOW-POWER MULTI-BAY PARKING METER

Matter enclosed in heavy brackets [ ] appears in the original patent but forms no part of this reissue specification; matter printed in italics indicates the additions made by reissue.

*CROSS-REFERENCE TO OTHER APPLICATION*

*This application is a continuation-in-part of application 08/281,700, filed Jul. 28, 1994, which issued on Dec. 12, 1995 as U.S. Pat. No. 5,475,373 and which itself is a divisional of application Ser. No. 07/864,479, filed Apr. 7, 1992, which issued as U.S. Pat. No. 5,360,095 on Nov. 1, 1994.*

BACKGROUND OF THE INVENTION

I. Field of the Invention

This invention relates generally to parking meters. More particularly, the present invention relates to individual parking meters that control multiple parking spaces or bays.

II. Description of the Prior Art

A variety of electronic and mechanical parking meters are. well-known in the prior art. Typical parking meters receive one or more coins to begin a timing interval during which a vehicle may remain parked in an appropriate space associated with and adjacent to the parking meter.

The timing interval, or the amount of time vended by the meter to the user, is typically determined by the number and value of the coins which are inserted into the parking meter.

Recently, electronic parking meters have evolved for digitally, electronically vending time. Although such electronic parking meters often have mechanical parts, the primary thrust of modern parking meter technology is directed to solid state circuitry and apparatus for parking meters which minimizes downtime, reduces mechanical unreliability, and provides an electronic means of accounting.

An advantage of modern electronic computerized parking meters is that they may be triggered externally without the use of coins. Accordingly, payment slots may be included for the use of debit cards which are incremented by the circuitry. Prepaid parking "time" represented by magnetic information on the cards may be used to vend time.

As an example, attention is directed to U.S. Pat. No. 4,880,097, owned by the same assignee as in this case. When such a "debit" card (i.e. normally the size of a plastic credit card) is used to purchase time, it need be simply inserted into the parking slot or the coin slot. Alternatively, the parking card and coins may be inserted into separate slots. A purchaser may vary the amount of time purchased on the meter, either by using his debit card or by inserting required coins.

A further advantage of the electronic meters is that fewer coins need be collected and handled, since much of the meter time is purchased by the park card. The meter then electronically stores in its memory the meter activity thereby reducing the number of coins in the meter.

Advanced electronic meters of the type described in the '097 patent further simplify accounting procedures. An auditor is typically used to program the parking meter and/or to extract data from the parking meter, such as the activity of the meter, etc. Also, the auditor can be used to program and gather data from the parking meter by connecting the auditor directly.

Older mechanical parking meters require the meter reader to manually empty the coins from each meter and tally them to determine meter activity. With electronic parking meters, this may be substantially avoided. For example, accumulated parking time and accumulated sales may be stored within electronic memory. Moreover, "busy" times of the day may be computed. Electronic programming responsible for such meters allows the user to easily vary parking rates or change them when desired.

Outdoor vending devices such as meters must be capable of withstanding the elements. To lessen the likelihood of failures, the meters must be relatively well-protected from weather conditions.

However, known prior electronic and mechanical parking meters fail to maximize the potential storage capacity and vending capabilities of electronic meters while remaining user friendly. A desirous parking meter would be able to store multiple parking space activity while concurrently vending the multiple parking spaces.

Preferably, the meter would remain relatively simple to operate and would not require an operator to learn or acquire any new skills or programming expertise. Such a new parking meter would greatly increase the efficiency of the individual parking meter while reducing maintenance requirements, costs, accounting and verification procedures.

Ideally, this meter could record and store the activities for up to four parking spaces, thus requiring data to be retrieved from only one meter instead of several individual meters. Also, coins would only need to be collected from one meter.

Of course, a single multiple bay parking meter would consume less power than several single bay parking meters. Another requirement of any multiple bay parking meter would be that any operator would be able to accurately select the particular parking bay to be paid for. Such a multiple bay meter would preferably use a digital screen that would permit the operator to quickly identify the desired bay. Of course, the meter should require no special skills on the part of the operator to manipulate the meter.

SUMMARY OF THE INVENTION

My multiple bay parking meter permits a single meter to vend time to several parking bays concurrently. Three embodiments are illustrated. The two bay version may comprise either a digital display alone, or the display may be combined with a colored indicator using a rotary display flag-wheel. A four bay version omits the flag wheel.

The meter comprises a generally [cubicle] *cubical*, exterior metallic casing that protectively houses the internal mechanism. The exterior casing also supports a removeable top. The top has a base and an integral arched portion that circumscribes a front view port and a back view port.

The casing interior houses the meter mechanism, that comprises a support frame, a front and a rear shell. A main circuit board is housed between the front shell and the rear shell. The generally cubicle frame portion includes a raised face portion that registers within a rectangular notch defined in the front of the casing. The face portion thus forms a portion of the meter exterior.

Portions of the payment system project outwardly from the exterior frame face. The payment buttons associated with the selection system also project outwardly from the frame face, and register with casing orifices that are adjacent to the notch.

The payment system and selection system permit an operator to selectively vend time for a chosen parking space or bay. Typically, payment system comprises a debit card slot and/or a coin slot for acceptance of payment. The debit card slot may receive a "debit" card that is mechanically guided and electronically interrogated through a variety of known techniques.

An internal card reader communicates with the card slot to accept and interrogate the card. A plug on the back of the reader extends through the front shell to connect to the main circuit board.

Coins inputted through the coin slot in the face drop into a chute system that may ultimately trigger the meter circuitry to initiate a vend. A plug on the back of the chute system extends through an orifice in the front shell to an appropriate connector on the main circuit board.

The selection system permits an operator to selectively choose which of the parking spaces or bays vended by the meter the operator desires to utilize. The selection system comprises an external switch plate, a plurality of external switches and an internal switch board. The switch plate rigidly mounts on the frame.

The switch board comprises a front connector that mounts directly to switch plate inside the frame. A plug projects on the opposite side of board. The plug extends through the front shell to the main circuit board.

A digital display is provided by an LCD display on the main circuit board. The meter displays the status of each bay via the LCD display. In the two bay embodiment, the meter uses digital indicators that may be combined with colored displays. All are visible through the top view ports. With the alternative two bay embodiment and the preferred four bay embodiment, only digital indicators are used. On all three embodiments, the front digital indicator may display the time remaining for a selected bay or the status of each bay.

On the preferred two bay embodiment, a colored flag wheel indicates the immediate status of each bay. Pie-shaped segments of the flag wheel are visible at the meter front through two side windows located adjacent each end of the digital indicator. The side windows reveal an immediate indication of the status of each bay indicated by the position of the colored segments. The back of the meter on the preferred two bay embodiment shows a selected portion of the multi-colored flag wheel in adjacent portions of a viewing window. The back of the flag wheel is also divided into several radially spaced apart, colored segments. Some segments are colored green to indicate that time is available; other segments are colored red to indicate that time has expired. Yellow segments critically located between other color segments identify when a jam has occurred. The flag wheel rotates to present an appropriate combination of segments through the meter windows for viewing from the meter exterior. In this manner service and enforcement duties are greatly simplified.

The alternative two bay embodiment and the four bay embodiment both omit the rotary flag wheel. Instead, these meters comprises a rear LCD display that functions in cooperation with the front LCD display. The four bay meter accommodates four separate parking spaces.

The preferred circuitry of all embodiments is substantially the same. The circuit uses a CPU that is interfaced with the multi bay plug. The CPU controls a stepper motor that rotates the flag wheel. The LCD display is also controlled by the CPU.

The circuit accommodates the switch inputs from the external buttons discussed earlier. When a button is pushed, a switch is selected by the multi bay card. The multi bay card applies voltage across an appropriate load resistor. This voltage is transmitted to a controller chip.

During vending, an operator selects the desired parking bay represented by appropriate external buttons, deposits funds and time is vended accordingly. Alternatively, the operator may deposit coins or insert a card prior to choosing a bay. If funds are predeposited, the meter escrows the deposited funds until a bay is chosen.

On power-up of a two bay meter, both spaces or bays will be expired with the LCD display showing "EE" and the flag wheel, if included, will display Red—Red to indicate "Expired" on the back while showing Red in the side display windows. On power-up of the alternative two bay meter, all bays or parking spaces will be expired, with the LCD showing "EE" on the front and rear numeric LCD's. On power-up on a four bay device, all bays or spaces will be expired with the LCD showing "EEEE" on the front and rear numeric LCD's. At this time the meter is in the idle loop waiting for a coin, card, or switch to be pressed.

If no switch is pressed and money is inserted, then the meter will alternately display "SEL" and "SPC" until the user selects a bay or space. This time will continue to "escrow" until a space is selected. If the user never selects a space and leaves, then the time escrowed will zero out after a specified timeout period programmed in the software. When a switch is pressed, the program will proceed to the multi bay switch handler.

If no switch is pressed and a card is inserted, then the meter will alternate displaying "SEL" and "SPC" until a space is selected. No deductions from a parking card will be taken until a switch is pressed thereby selecting a bay or space.

If a switch is pressed, the meter processes the information in a multi bay switch handler. The bay or space is determined from the CPU and the appropriate bay is set active. If there is time escrowed, the meter will credit the time to an appropriate bay or space. The LCD display is updated to the correct amount of time purchased and the optional two-bay flag wheel is moved to the correct position. The meter sets the space as active for a specified time interval after the last coin is inserted showing the time purchased in that bay. After a short time interval, the meter returns to the idle loop. The updated idle loop display for vended time is an "—" for each vended bay.

Thus a primary object of the present invention is to provide a low power parking meter for use in multi bay installation.

Another object is to provide a multi bay parking meter of the character described which avoids the use of external power, and minimizes the consumption of internal battery or capacitor stored charge.

A fundamental object is to monitor and control several parking spaces at once with a single meter.

Another important object is to provide a reliable, easy-to-use parking multi bay meter that is user friendly.

A related object is to provide a low power, multi bay parking meter of the character described that does not absolutely require user instructions to be inputted in a single sequence. It is an important feature of the meters described herein that the customer may first make a bay selection and then provide payment, or he may make payment first and then make a bay selection.

Another object of the invention is to provide a unique display technique wherein a plurality of parking spaces or bays can be monitored from a single meter.

A basic object is to provide a multi-bay parking meter for vending time for a plurality of parking spaces that accepts payment in the form of coins or cards.

A related object is to provide a display of the status of multiple parking bays without touching the parking meter.

Another object is to provide an electronic multi bay parking meter of the character described which avoids computer menu scrolling. It is a feature of our multiple bay meter designs that separate switches are provided for each bay that may be selected to minimize scrolling and enhance a user's chances to intuitively operate the meter.

A similar object is to provide a multi-bay parking meter with a computer control program that enables operators to quickly and easily discern how to operate the device.

Another object is to escrow money that is put in properly, so that once a financial input is made, the purchaser has a chance to select the proper bay to which the money should be applied.

Another important object of the invention is to provide a low power multi bay parking meter of the character described that allows the selection of space without programming skills.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

The apparatus to be hereinafter described in most advantageously employed in conjunction with parking meters. However, the teachings of the present invention relate to vending machines in general, and particularly to those vending machines which include electronic circuitry for monitoring vends, sales, time increments, accumulated sales, and the like.

The present invention is ideally adapted for modern electronic parking meters, such as the meter of U.S. Pat. No. 4,823,928 owned by the same assignee as in this case. For disclosure purposes the latter reference is incorporated by reference herein.

Figure 1:
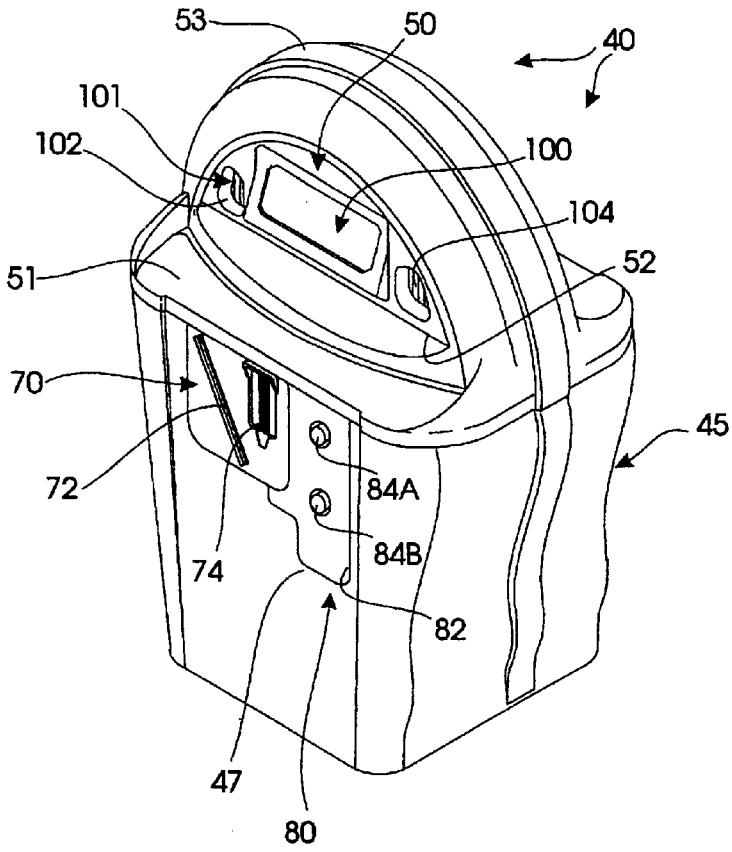
FIG. 1 is a front isometric view of a two bay embodiment of our multiple bay parking meter that includes a rotary flag wheel.
Figure 2:
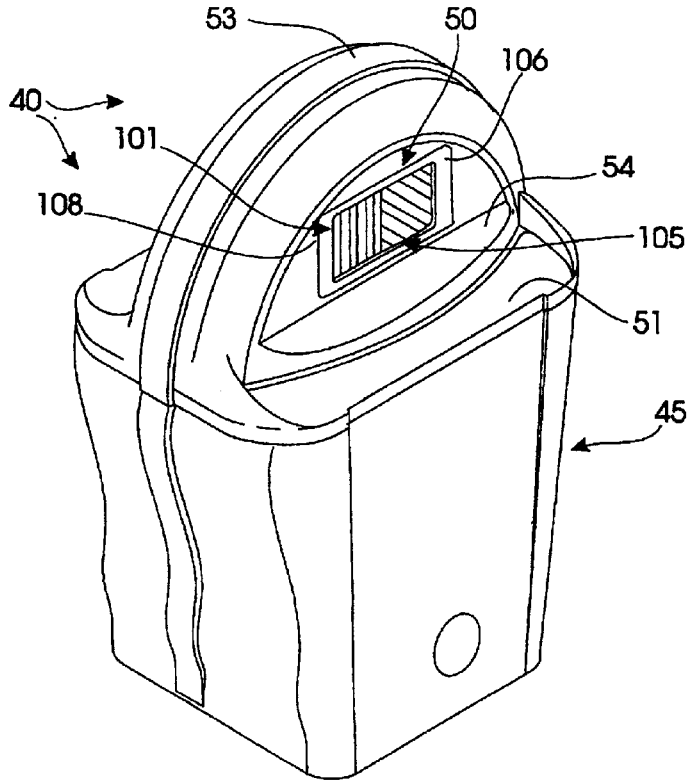
FIG. 2 is a rear isometric view of the parking meter of FIG. 1.
Figure 3:
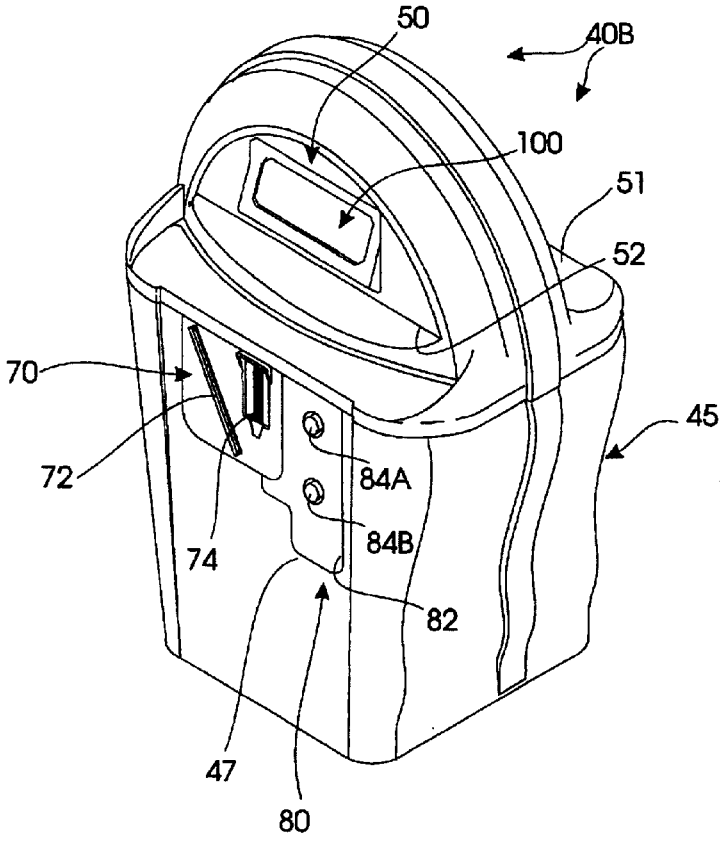
FIG. 3 is a front isometric view of an alternative embodiment of a two bay parking meter that omits the flag wheel.

In the various Figures three embodiments are illustrated. The two bay version may comprise either a digital display alone, or the display may be combined with a colored indicator using a rotary display flag-wheel to be hereinafter described. A four bay version omits the flag wheel. Most of the interior components, such as those seen in FIGS. 1–2, are common to all embodiments.

Two Bay Meter with Combined Color and Digital Display

Figure 7:
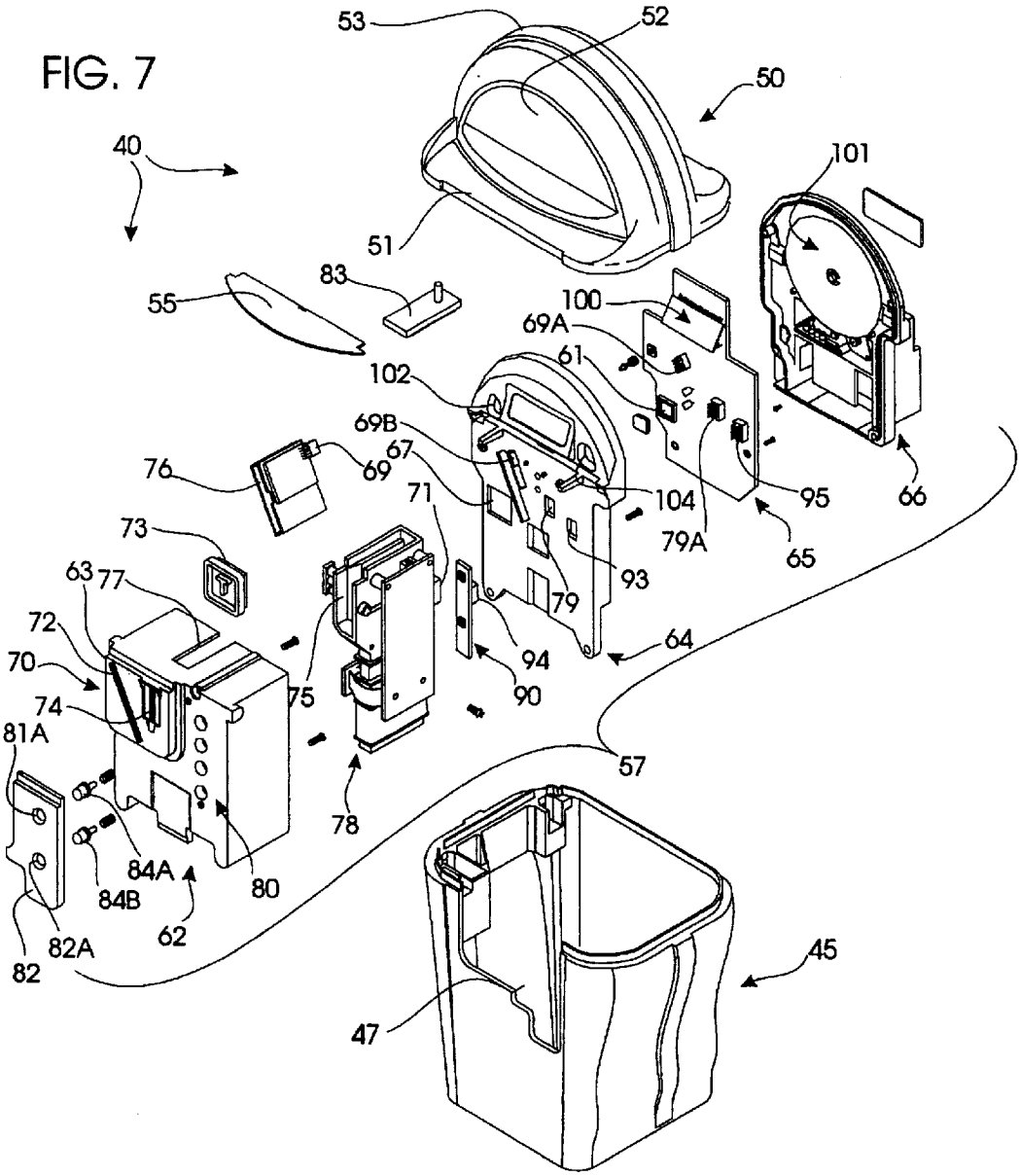
FIG. 7 is an exploded isometric view of the meter shown in FIGS. 1 and 2, with portions omitted for clarity.

An initial embodiment of our improved multiple bay parking meter has been generally designated by the reference numeral 40. Meter 40 is especially adapted for two bay operation (i.e., it handles two parking spaces). Preferably meter 40 comprises a generally cubicle, exterior metallic casing 45 (FIGS. 1, 2 and 7) that protectively houses the internal mechanism 57 to be discussed hereinafter. Casing 45 supports a removable top 50 having a base portion 51. The removable rate plate 55 fits over base 51. An integral arched portion 53 circumscribes a front view port 52 and a back view port 54. Preferably, both ports use see-through, shatterproof glass so that an operator can view the displays housed therein. As is well recognized in the art, the casing is normally fastened to a suitable stanchion in use, disposed adjacent the parking space or spaces to be rented.

The casing interior houses the meter mechanism 57, that comprises a support frame portion 62, a front shell 64 and a rear shell 66. A main circuit board 65 is housed between the front shell 64 and the rear shell 66. Front shell 64 includes a number of clearance orifices as illustrated. The CPU PROM socket 61 on the circuit board 65 may be accessed through access orifice 67 in front shell 64. A removable PROM access plug 73 is normally fitted to orifice 67.

The generally cubicle support frame portion 62 includes a raised face portion 63 (FIG. 7) that registers within a rectangular notch 47 defined in the front of casing 45. The face portion thus forms a portion of the meter exterior. Portions of the payment system 70 project outwardly from face 63. The payment buttons associated with selection system 80 project outwardly from face 63, and register with orifices 81A, 82A in casing 45 adjacent notch 47.

Payment system 70 and selection system 80 penetrate frame 62 to permit an operator to selectively vend time for a chosen parking space or bay. Typically, payment system 70 comprises a debit card slot 72 and/or a coin slot 74 for acceptance of payment. Slot 72 may receive a "debit" card that is mechanically guided and electronically interrogated through a variety of known techniques. An internal card reader 76 communicates with slot 72 to accept and interrogate the card. A plug 69 on the back of card reader 76 extends through an orifice 69B in front shell 64 to connector 69A on circuit board 65. Typical card receptor mechanisms for receiving debit cards and communicating with their integrated circuit and logic is seen in one or more of the following U.S. patents, issued to Alcatel CIT, Paris, France: U.S. Pat. Nos. 4,900,272, 4,900,273, 5,012,078, and 5,051,566.

Electronic parking meters that accept payment cards to vend parking time are thus well-known in the art. Specifically, prior U.S. Pat. Nos. 4,823,928 and 5,360,095, owned by the same assignee as in this case relate to parking meters that accept payment cards. For disclosure purposes, the latter references are hereby incorporated by reference herein.

Coin acceptance is discussed in detail in U.S. Pat. Nos. 4,823,928 and 4,895,238 owned by the same assignee as in this case, and which are incorporated by reference herein. Payment coins inputted through coin slot 74 in face 63 drop into a chute system 78 that may ultimately trigger the meter circuitry to initiate a vend. Chute system 78 is assembled proximate the interior of support frame 62. Coin input region 75 is positioned adjacent slot coin input slot 74 in assembly. The top of region 75 is positioned beneath coin-drop access slot 77 in frame 62. A coin chute access plate 83 removably covers slot 77. An electrical plug 71 on the back of coin chute system 78 extends through clearance orifice 79 in front shell 63 to connection plug 79A projecting from circuit board 65. Digital readings are provided by LCD display 91 on board 65.

Selection system 80 permits an operator to selectively choose which of the parking spaces or bays vended by the meter the operator desires to utilize. The selection system 80 comprises an external switch plate 82, a plurality of external switches and an internal switch board 90. The switch plate 82 rigidly mounts on frame 62 (FIGS. 1–6), and it has either two or four clearance orifices (i.e., orifices 81A and 82A) to accommodate the push-button bay select switches (i.e., 84A and 84B) to be hereinafter described. Switch board 90 comprises a front connector 92 that mounts directly to switch plate 82 inside frame 62. A plug 94 projects on the opposite side of board 90. Plug 94 extends through orifice 93 in front shell 63 to board 65 via plug 95.

Meter 40 displays the status of each bay using either colored indicators or digital indicators that are visible through top 50. With the preferred two bay embodiment, colored indicators and digital indicators are both used (see FIGS. 10–19). With the alternative two bay embodiment and the preferred four bay embodiment, only digital indicators are used. On all three embodiments, the front digital indicator 100 may display the time remaining for a selected bay or the status of each bay.

On the preferred two bay embodiment, a colored rotary wheel 101 indicates the immediate status of each bay. A selected pie-shaped portion of wheel 101 is visible through two side windows 102, 104, located adjacent each end of digital indicator 100, provide an immediate indication of the status of each bay. The back of meter 40 on the preferred two bay embodiment uses a rear window 105. On the preferred two bay embodiment, the rear window 105 has right and left sides 106, 108 (FIG. 2) to show a selected portion of multi-colored flag wheel 101.

Figure 20:
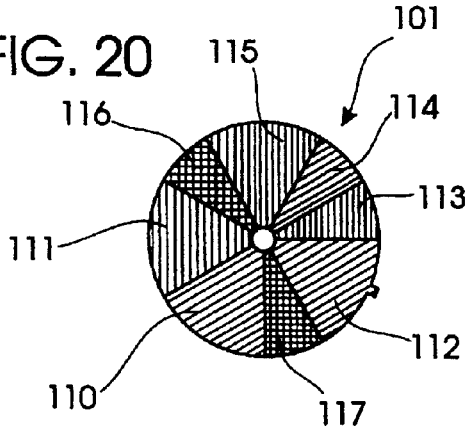
FIG. 20 is an elevational view of the front of the rotary flag wheel indicator with the display segments lined for color.
Figure 21:
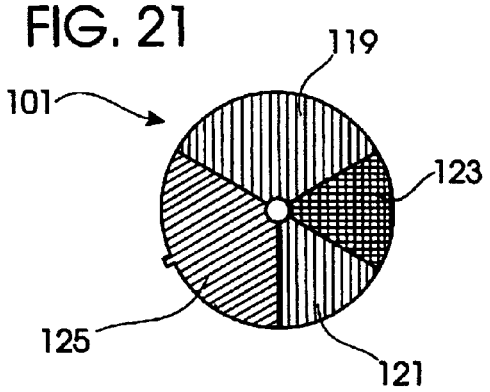
FIG. 21 is an elevational view of the rear of the flag wheel indicator with the display segments lined for color.

As best seen in FIG. 20, the front of the flag wheel is preferably divided into eight radially spaced apart, pie-shaped segments, 110–117. Pie-shaped segments 110, 112 and 114 are colored green to indicate that paid-for time is unexpired for a particular parking bay. Segments 111, 113 and 115 are colored red to indicate that time is expired. Segments 116 and 117 are colored yellow to indicate that the meter is jammed or otherwise requires service. The flag wheel 101 is rotated to present an appropriate combination of segments 110–117 through front windows 102 or 104 for viewing from the meter exterior.

The rear of the flag wheel is divided into radially spaced apart, pie shaped segments 119, 121, 123 and 125 that are concurrently displayed through the rear window 105. Segments 119 and 121 on the rear face of the flag wheel 101 are colored red to indicate time expiration. Segment 125 is green. Segment 123 is yellow, and represents that the meter needs service. The colored sold-out display on the front of the meter is seen in FIGS. 12, 14, 16 and 18. The smaller colored wheel segments 113, 114 are necessary since the windows 102 and 104 in the meter front are spaced apart. The rear viewing windows are adjacent one another (FIG. 11) so less colored segments on the flag wheel rear face are necessary.

Figure 13:
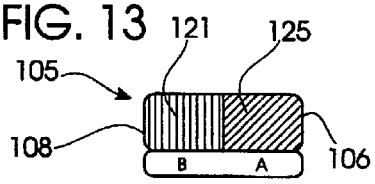
FIG. 13 is a greatly enlarged, rear elevational view of the display shown in FIG. 11, showing the rear color indicators that display the status of both bays concurrently with the front display of FIG. 12.
Figure 14:
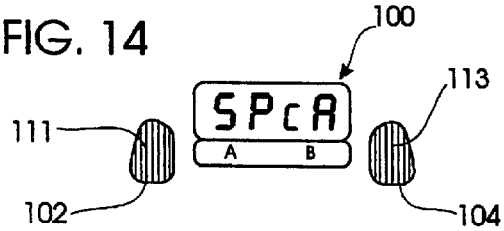
FIG. 14 is a greatly enlarged, front elevational view of the display similar to FIG. 12, showing the front digital indicator and the side color indicators that display the status of both bays, immediately after a bay-select switch has been depressed.
Figure 15:
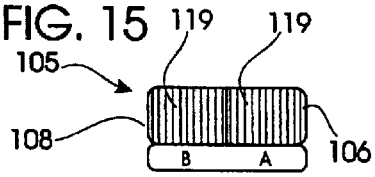
FIG. 15 is a greatly enlarged, rear elevational view of the display similar to FIG. 13, showing the rear color indicators that display the status of both bays concurrently with the front display of FIG. 14.
Figure 16:
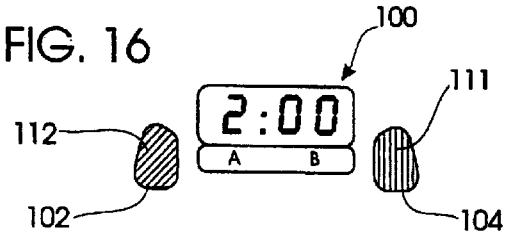
FIG. 16 is a greatly enlarged, front elevational view of the display similar to FIG. 12 indicating the time remaining for selected bay "A"
Figure 17:
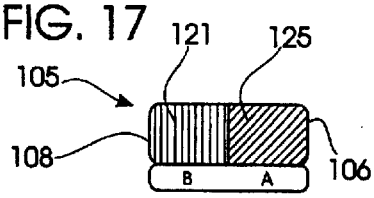
FIG. 17 is a greatly enlarged, rear elevational view of the display showing the rear color indicators that display the status of both bays concurrently with the front display of FIG. 16.
Figure 18:
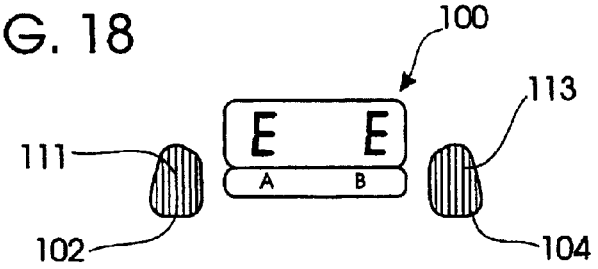
FIG. 18 is a greatly enlarged, front elevational view of the display similar to FIG. 12, showing the front digital indicator and the side color indicators that display the status of both bays, indicating that the vended time has expired for both bays "A" and "B;"
Figure 19:
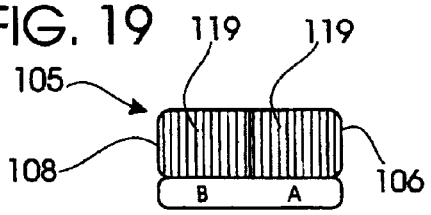
FIG. 19 is a greatly enlarged, rear elevational view showing the rear color indicators that display the status of both bays concurrently with the front display of FIG. 18 and indicating that the vended time has expired for both bays.

The latter colored segments are presented to the viewing windows by appropriate rotation of the flag wheel 101 to the position seen in FIG. 19. FIGS. 13, 15 and 17 indicate other rear display possibilities. FIG. 18 indicates the display achieved when time has expired with both parking spaces; colored flag wheel segments are behind windows 102 and 104. When time has been purchased for space A, as in FIGS. 16–17, but not for space B, the wheel rotates to show green in window 102, while window 104 may still be red. When time for space B is vended, wheel 110 rotates to color window 104 red. When time is purchased for both slots, then red segments are placed behind windows 102 and 104. The rear window sides 106 and 108 are colored concurrently by matching color segments that rotate with wheel 110 at the meter rear. The yellow segments of the wheel 101 are displayed when the computer senses a jammed condition, or the unit otherwise requires service.

Two Bay Meter with Digital Display

Figure 4:
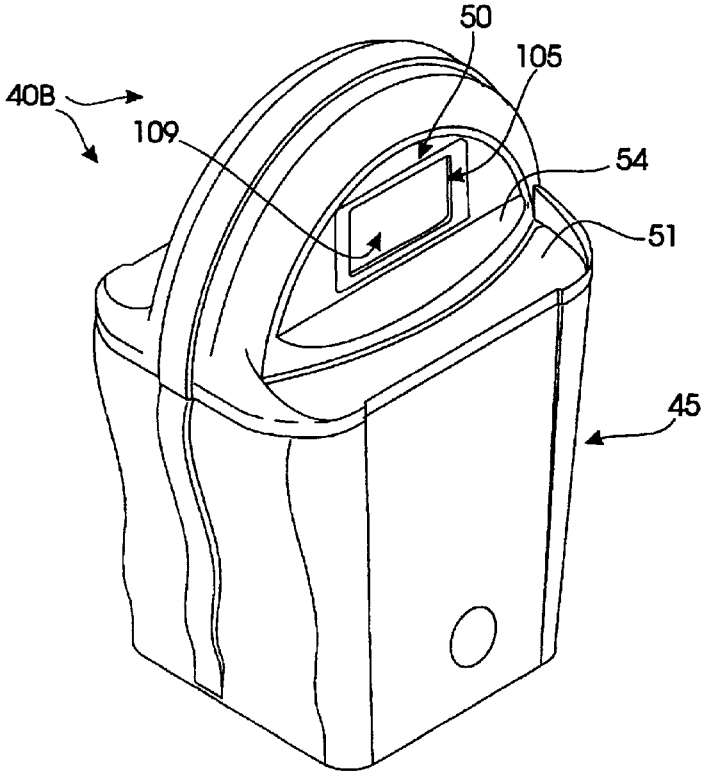
FIG. 4 is a rear isometric view of the parking meter of FIG. 3.
Figure 5:
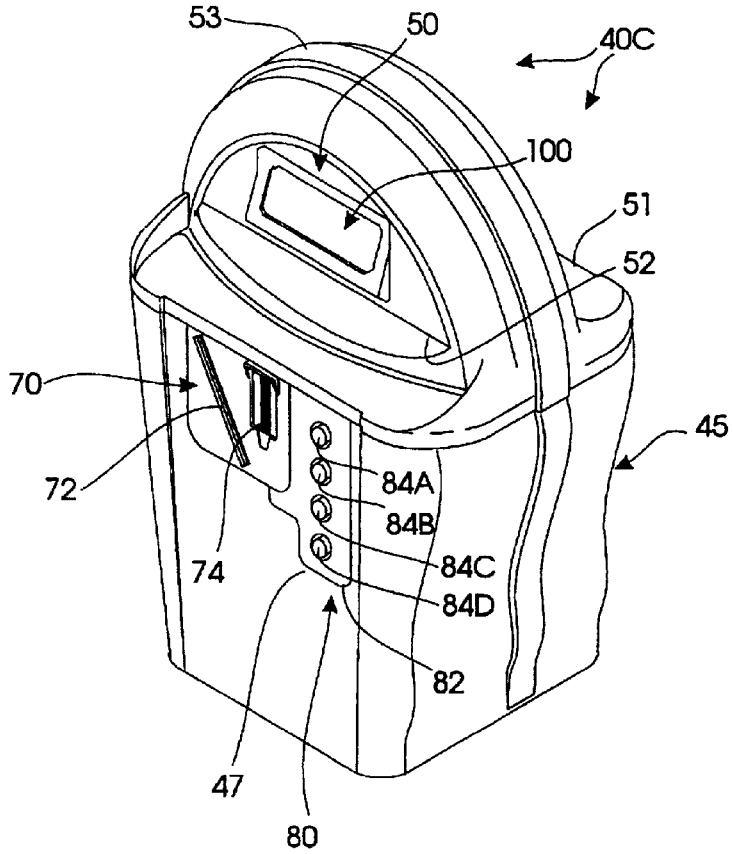
FIG. 5 is a front isometric view of a four bay parking meter.
Figure 6:
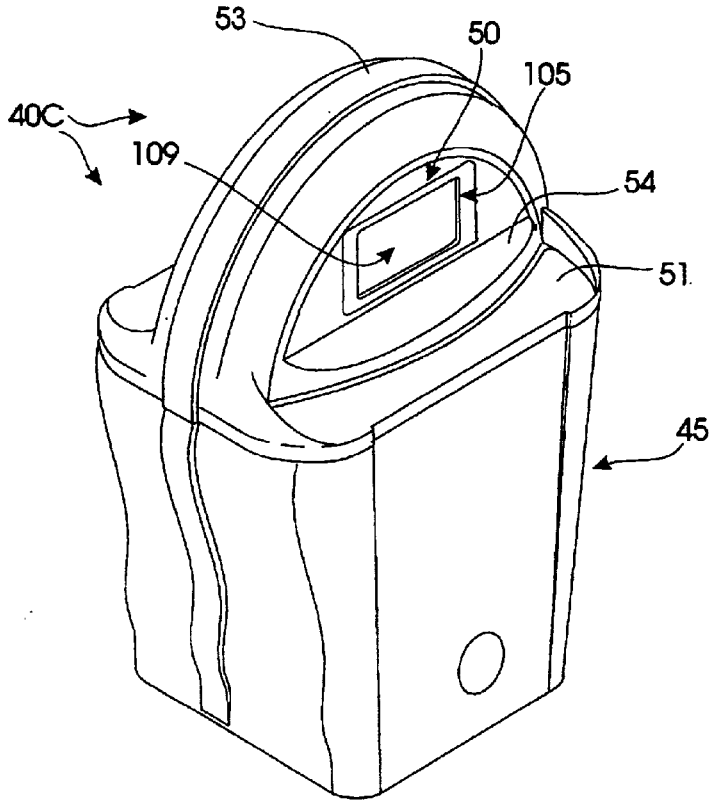
FIG. 6 is a rear isometric view of the parking meter of FIG. 5.
Figure 8:
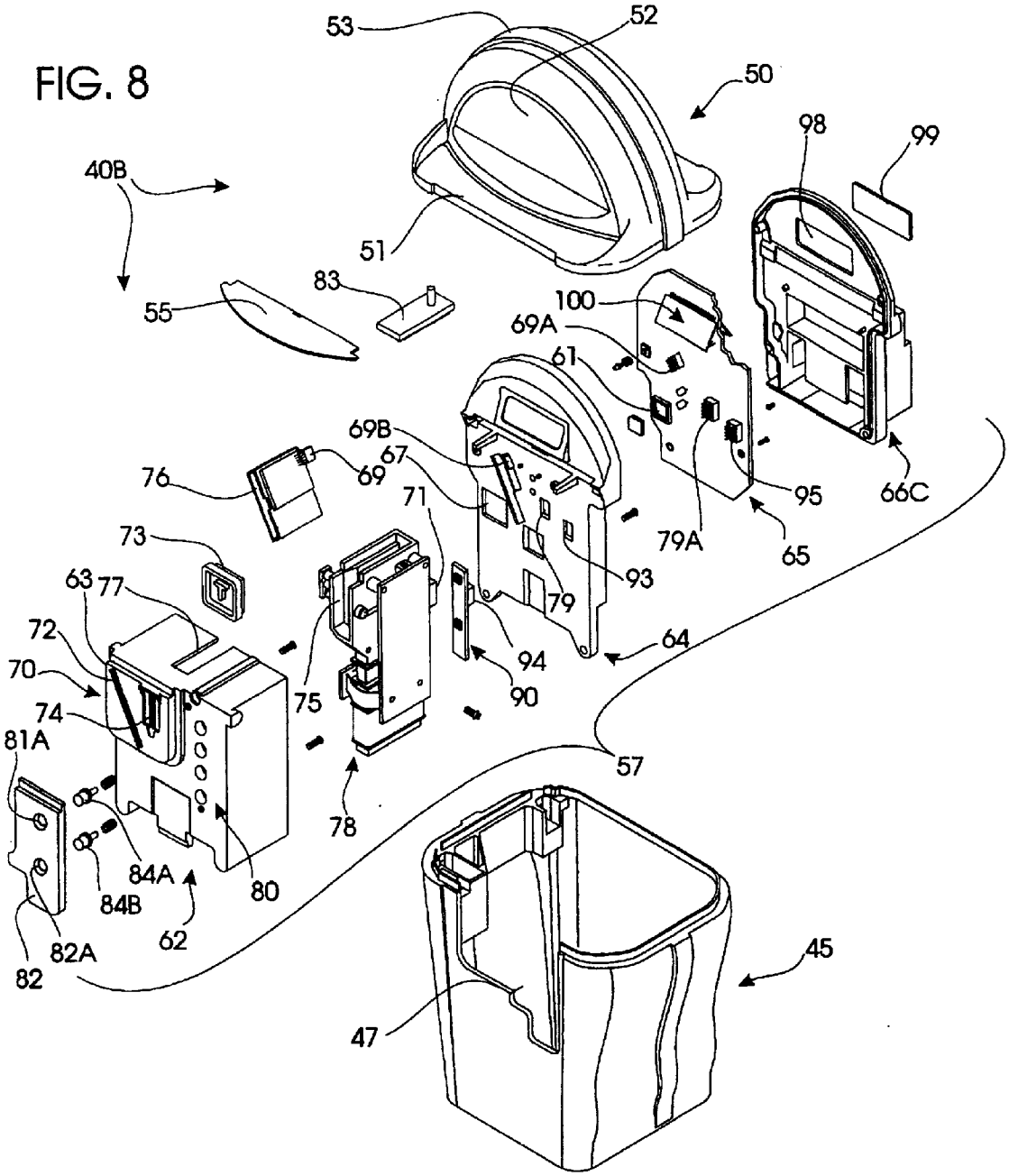
FIG. 8 is an exploded isometric view of the meter shown in FIGS. 3 and 4, with portions omitted for clarity.

Meter 40B (FIGS. 3, 4, and 8) is largely the same as meter 40 discussed above. However, it omits the flag wheel 101, and the front and rear viewing windows discussed earlier. However, as seen in FIG. 4, meter 40B comprises a rear digital display 109 that functions in cooperation with display 100 on the front. The color display window indicators 102, 104, 106 and 108 discussed previously are not used. A rear digital indicator 109 that is identical to the front digital indicator 100 is used instead. Modified rear shell 66C (FIG. 8) includes a display viewing orifice 98 for mounting window glass 99.

Four Bay Meter with Digital Display

Figure 9:
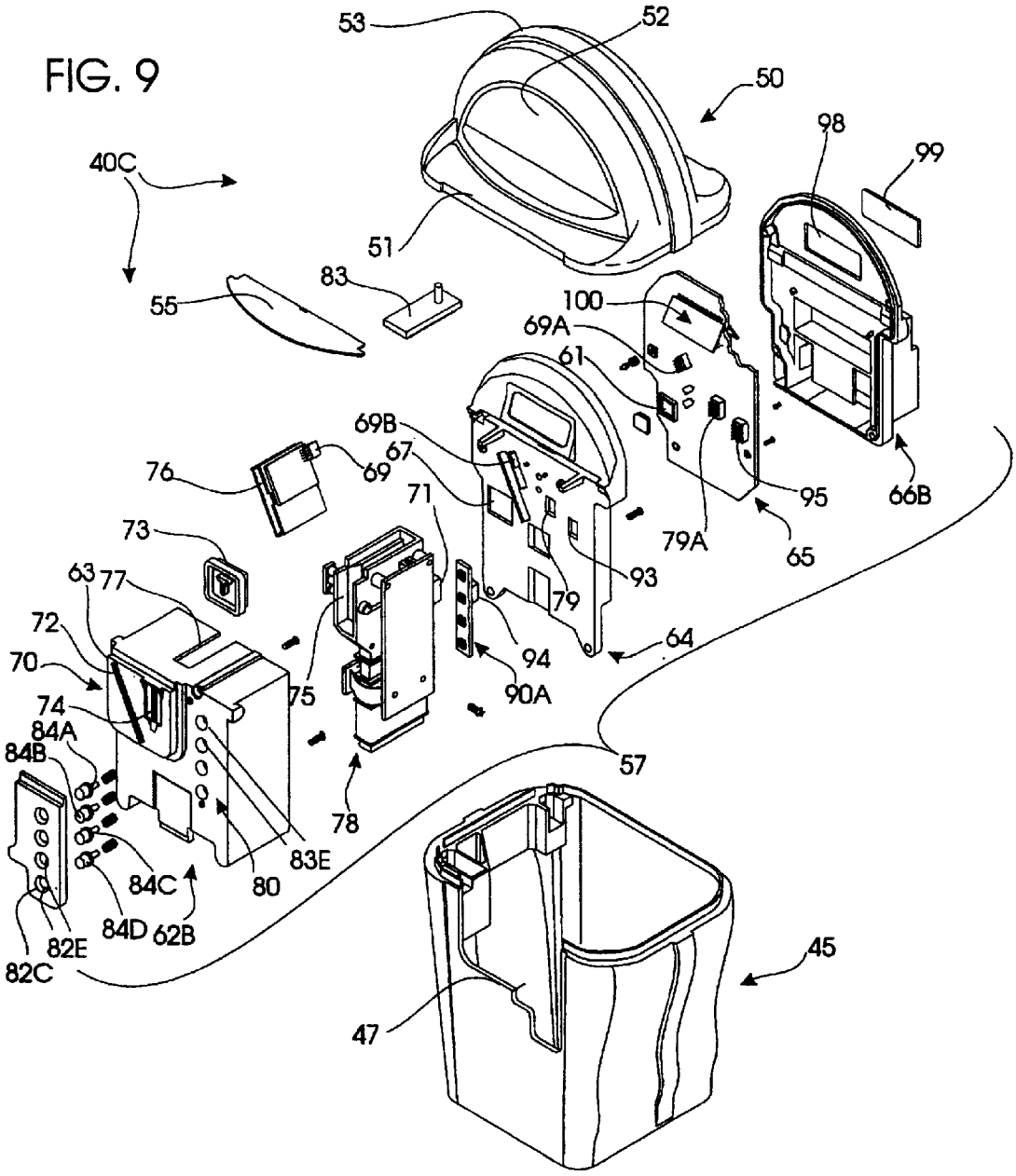
FIG. 9 is an exploded isometric view of the four-bay meter shown in FIGS. 5 and 6, with portions omitted for clarity.
Figure 10:
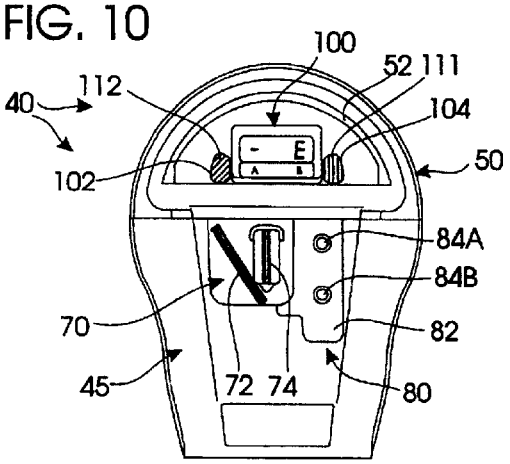
FIG. 10 is a front elevational view showing the two bay parking meter of FIGS. 1, 2 and 7 with the front display showing time available in bay "A" and time expired in bay "B;"
Figure 11:
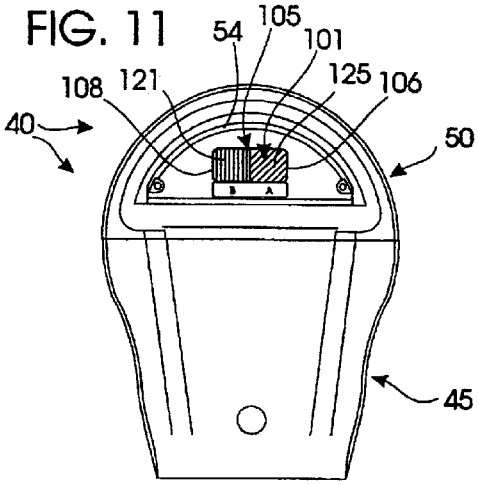
FIG. 11 is a rear elevational views of the meter shown in FIG. 10.
Figure 12:
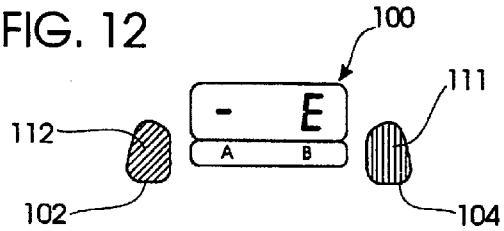
FIG. 12 is a greatly enlarged, front elevational view of the display shown in FIG. 10, showing the front digital indicator and the side color indicators that display the status of both bays.

Meter 40C (FIGS. 5, 6, and 9) is largely, insofar as digital display techniques, the same as two-bay meter 40B discussed above. However, four-bay meter 40C accommodates four separate parking spaces. Like meter 40B, it omits the flag wheel 101 and the front and rear viewing windows 102, 104, and 105 discussed earlier. However, four space selection buttons 84A–84D are employed on payment system 60 (FIG. 9). These buttons register rearwardly through orifices 83E in frame 62B and engage with support plate 90A. The push button faces project exteriorly outwardly of the meter through the orifices 82E in the modified plate 82C (FIG. 9). Modified rear shell 66B includes a display viewing orifice 98 for mounting window glass 99. Meter 40C comprises a rear digital display 109 that functions in cooperation with display 100 on its front.

Preferred Circuitry

The preferred circuitry of all embodiments of the present invention comprises a modification of that seen in prior U.S. Pat. Nos. 4,823,928 and 5,360,095, owned by the same assignee as in this case. Both relate to parking meters that employ the low power solid state circuitry. For disclosure purposes, the latter references are incorporated by reference herein.

Figure 22:
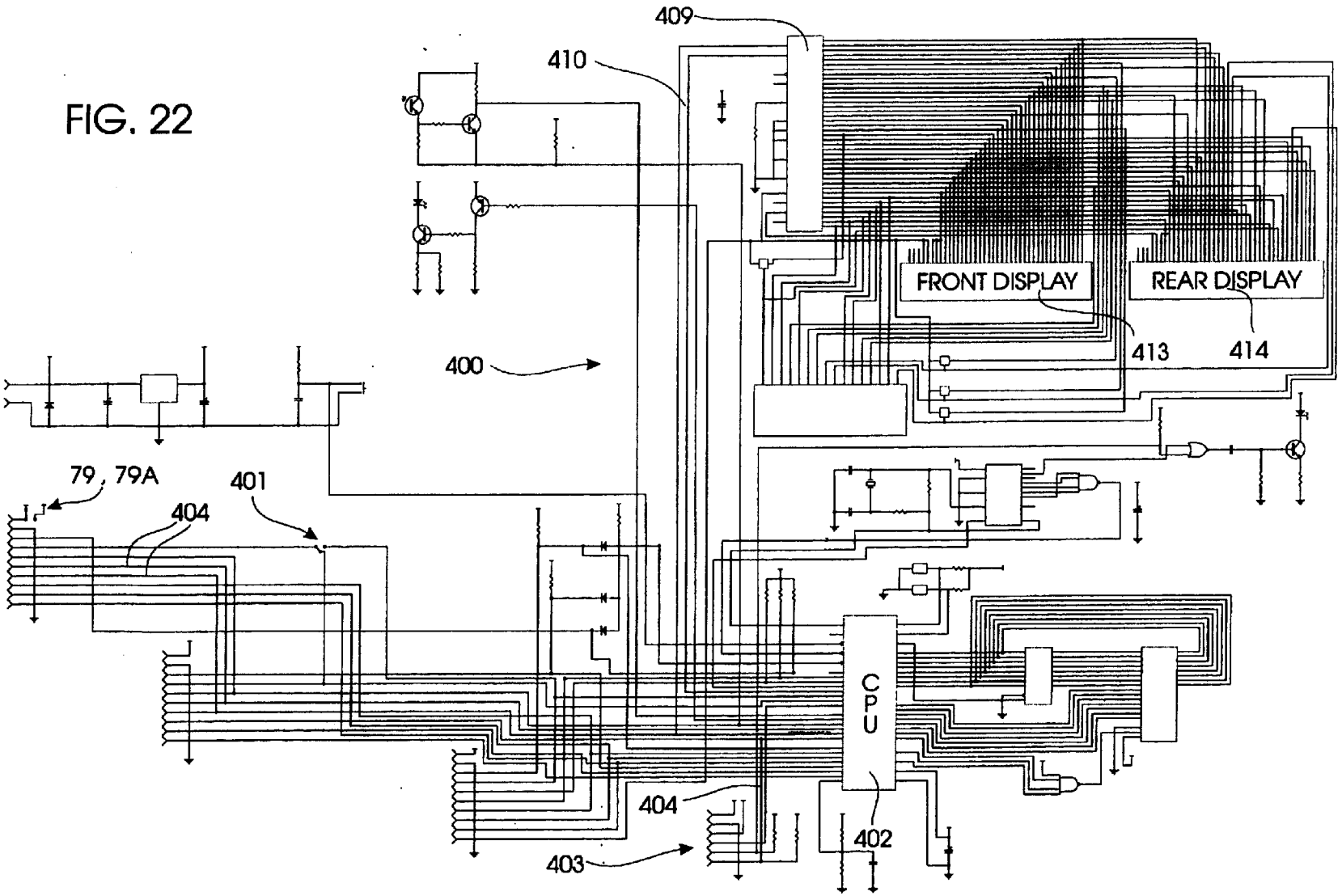
FIG. 22 is an electronic schematic diagram of the preferred main circuit board assembly circuitry.

With reference to FIG. 22, circuit 400 is largely borrowed from the above referenced patents. CPU 402 is interfaced with the multi bay plug 79A though lines 404. The flag wheel 101 is driven by a stepper motor controlled by lines 403. Lines 403 interconnect with the CPU 402 via lines 404. The display driver 409 is driven through lines 410 leading to the CPU. The front LCD display, used with all models, is designated by the reference numeral 413. The rear LCD display, that is used on all units that omit the flag wheel 101 has been designated with the reference numeral 414.

Figure 23:
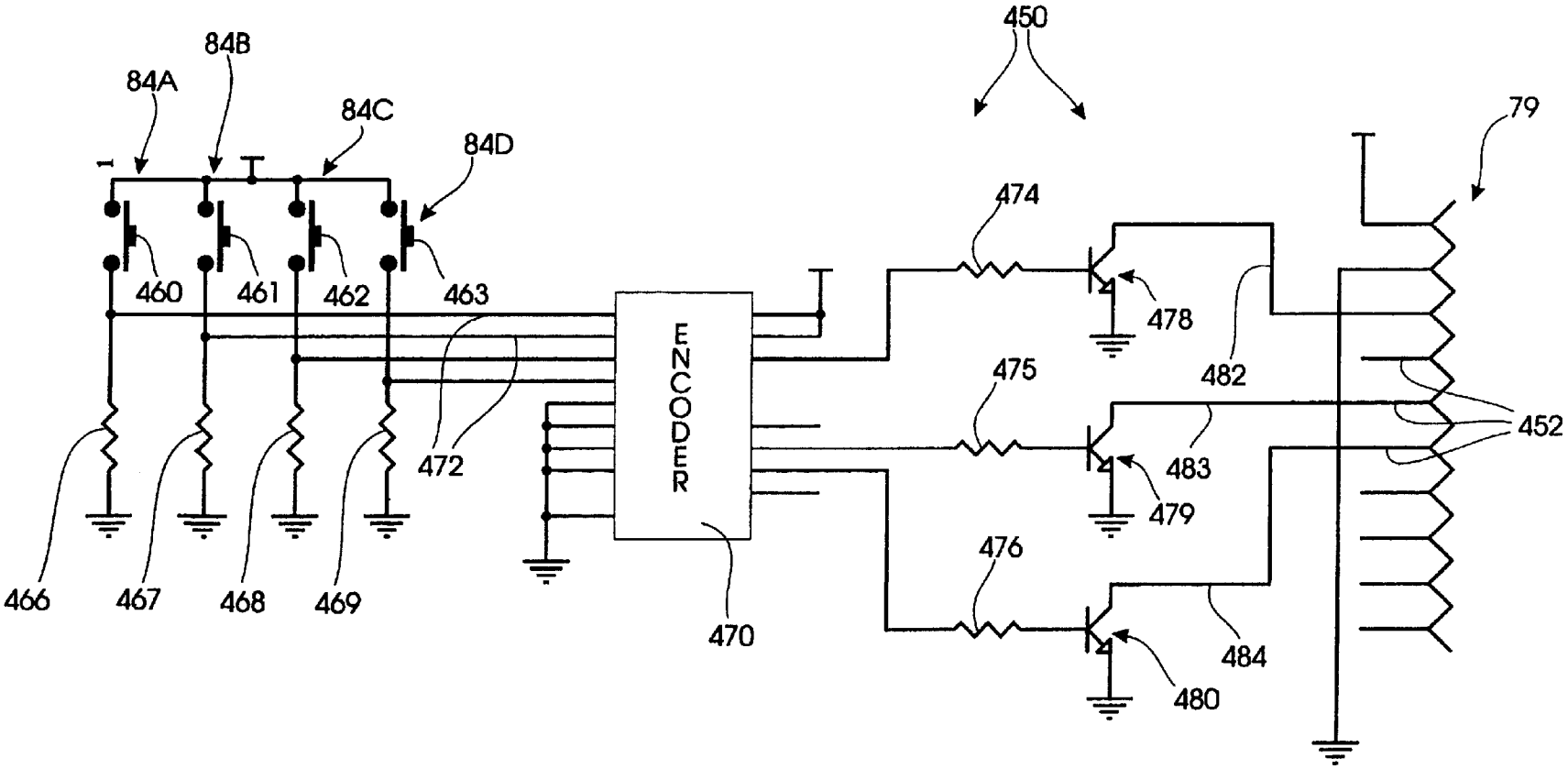
FIG. 23 is an electronic schematic diagram of the preferred bay switch board circuitry.

Circuit 450 (FIG. 23) accommodates the switch inputs such as switches 84A–84D discussed earlier. Lines 452 generally correspond to the plug connection 79A referenced earlier that plugs into the multi-bay plug detail seen in the left portion of FIG. 22. Switch 401 is provided to enable the circuit 400 to be quickly switched between conventional single bay units and the herein described multi-bay systems. The mechanical switches 84A–84D correspond generally to the push button switches 460–463 shown schematically. When a switch 460–463 is selected, it applies voltage across its load resistor 466–469 respectively. This voltage is transmitted to eight-bit encoder chip 470 via one of the lines 472.

Encoder chip 470 outputs via resistors 474–476 to driver transistors 478–480 respectively. The collector output of driver transistor 478 appearing on line 482 delivers an interrupt request to the CPU to warn that a meter selection is following. The interrupt signal indicates that, in a multi bay environment, one of a plurality of bays has received attention. For example, this may occur when a customer inserts coins or payment and activates the switches to select a bay. Once line 482 drops when transistor 478 is turned on, the logic state of lines 483 and 484 are queried to determine what parking bay is effected. If both lines 483 and 484 remain high, (i.e., logical 00) bay "A" has been selected. If line 483 drops in voltage (i.e., corresponding to a logical 01), then bay "B" is involved. Bay "C" receives attention if line 484 drops. If both lines 483 and 484 drop, corresponding to a logical 11, then bay "D" (i.e., the fourth parking space) is involved. In each instance the CPU will be directed to account for transactions and to associate them with a particular bay, and the displays and the financial accounting will be tied to a given parking space.

Preferred Software

Figure 24:
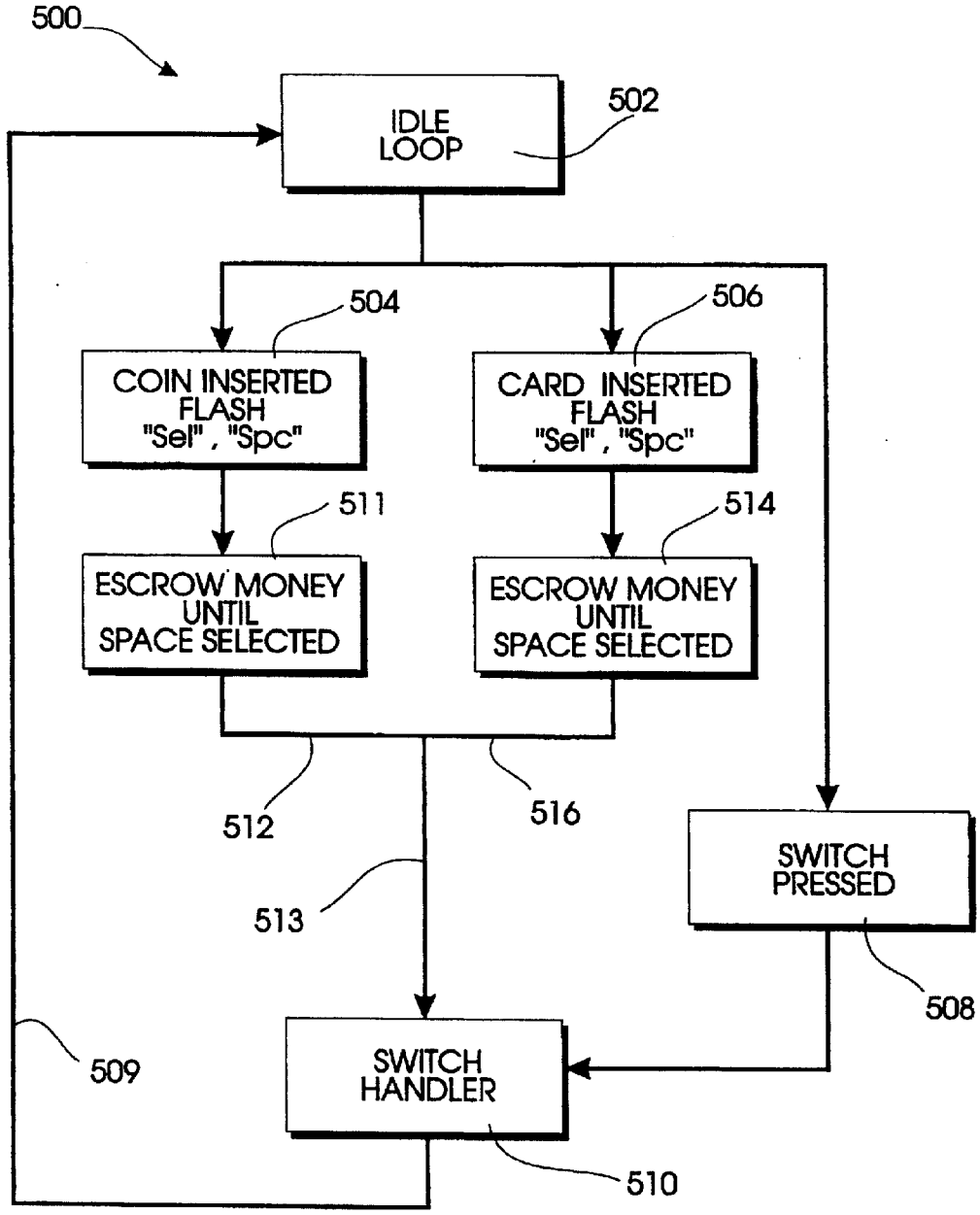
FIG. 24 is a flow diagram of the software routine for the parking meter; and, FIG. 25 is a flow diagram of the software routine for the switch handler.
Figure 25:
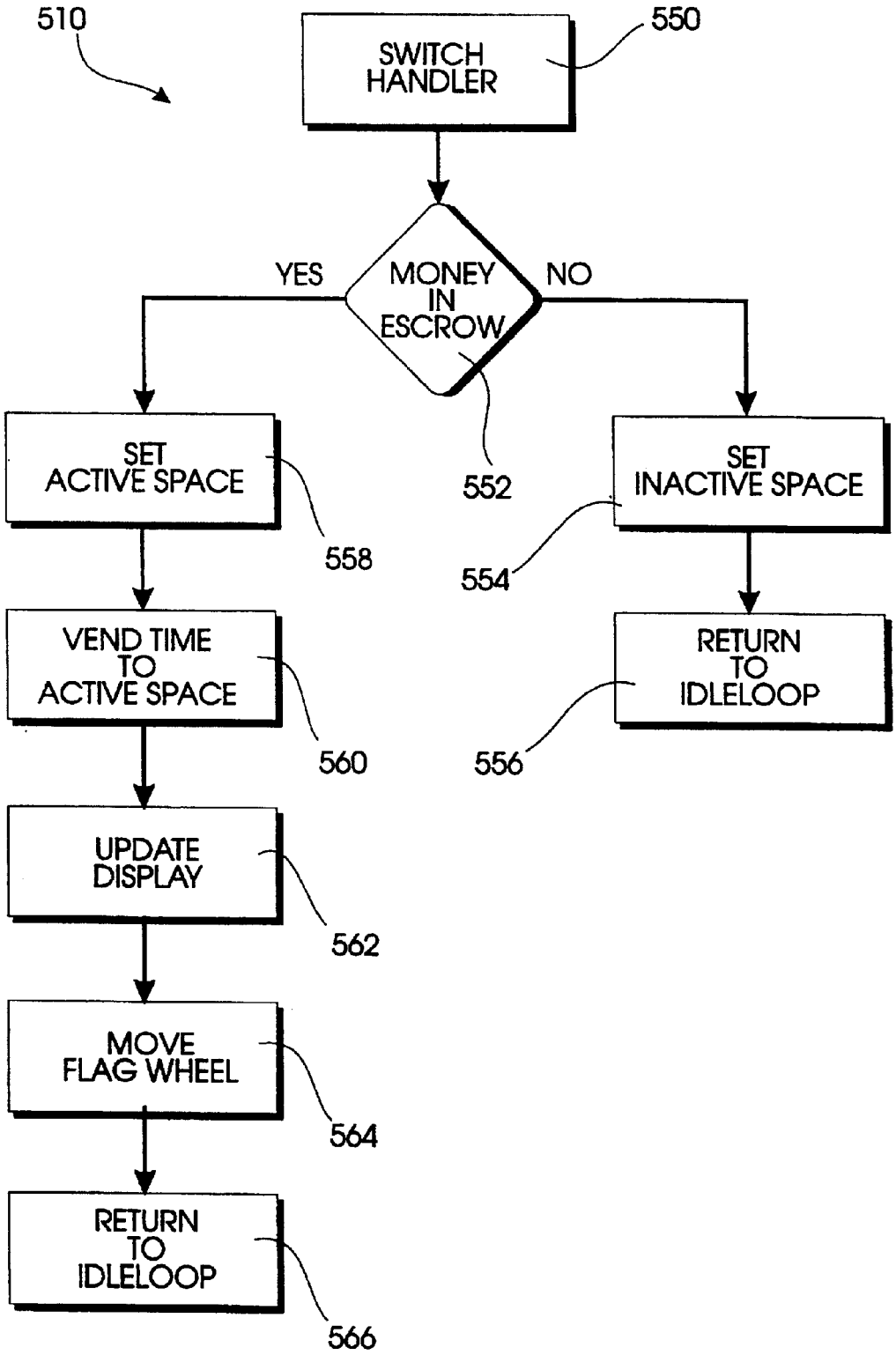

The main routine 500 is seen in FIG. 24. An idle loop 502 executes during periods of inactivity. At this time the apparatus is waiting for a coin, a debit card, or a bay switch input. Activity occurs when either a coin is inserted (step 504), a payment card is inserted (step 506), or a bay selection button is first pushed, indicated by step 508. When a bay selection switch is pressed, switch handler routine 510 to be described later is executed. Afterwards a return to idle loop 502 occurs as indicated by line 509.

If a coin was first inserted, as indicated by step 504, the LCD display will alternately flash "Sel" and then "Spc" to prompt the customer to choose a space by pressing the appropriate selection button. Concurrently, the dollar amount of coinage inserted will be "remembered" or escrowed as in step 511 until a parking spot is selected through the switch handler routine 510 is indicated by lines 512 and 513. If a switch is pressed, the switch handler routine 510 is executed, and afterwards a return to the idle loop 502 occurs as indicated by line 509.

If a payment card was first inserted, as indicated by step 506, the display will flash "Sel" and then "Spc" to prompt the customer to choose a space. Concurrently, the card transaction amount is escrowed in step 514. Then as indicated by lines 516 and 513, the routine waits for the switch handler step 510. If a switch is activated, the switch handler routine 510 is executed, and afterwards a return to the idle loop 502 occurs.

The switch pressed step 508 occurs in response to customer activation of one of the push button switches 84A–84D. The switch handler step 510 follows.

The switch handling routine 510 looks for the selection of a particular bay in step 550. Decision step 552 waits for the input of money or a card for a preselected time, and if no value is inputted, it executes step 554 to return that space to inactive status, and returns to the idle loop with step 556, so that the apparatus may again go idle.

If credit in escrow is found in step 552 within the time limits, the correct space is made active in step 558. Time is vended to the appropriate space in step 560, and the amount of time remaining is updated on the display in step 562. Flag wheel instructions are generated in step 564, and a return to idle mode is made in step 566.

Operation

Normally, the meter functions in the "idle loop" mode to conserve power. During the "idle loop", the digital front indicator on all embodiments shows either a "-" for each bay for which time remains and an "E" for each bay for which no time remains. Additionally, on the preferred two bay embodiment, the side indicators 102, 104 show green if time remains or red if time has expired. The rear window sides 106, 108 on the two bay embodiment correspondingly show green or red.

The preferred four bay embodiment uses front and rear indicators 100, 109. Since the meter displays the status of each bay during the "idle loop", a patrol person can easily identify which bays have time remaining and act appropriately. Upon selection switch depression, the meter displays the time remaining for the selected bay. After a predetermined display period, the meter automatically returns to an "idle loop" to conserve power.

During vending, an operator selects the desired parking bay represented by switches 84A–84D, deposits funds and time is vended accordingly. Alternatively, the operator may deposit coins or insert a card prior to choosing a bay. If funds are predeposited, the meter escrows the deposited funds until a bay is chosen.

On power-up of a two bay meter, both spaces or bays will be expired with the LCD display showing "EE" (FIG. 18) and the flag wheel, if included, will display Red to indicate "Expired" on the back while showing Red—Red in the frontal display windows (FIGS. 18, 19). On power-up, all bays or parking spaces will be expired, with the LCD showing "EE" on the front and rear numeric LCD's (FIG. 18). On power-up on a four bay device, all bays or spaces will be expired with the LCD showing "EEEE" on the front and rear numeric LCD's. At this time the meter is in the idle loop (i.e., step 502 in FIG. 24) waiting for a coin, card, or switch to be pressed.

If no switch is pressed and money is inserted then the meter will alternately display "SEL" and "SPC" until the user selects a bay or space. This time will continue to "escrow" until a space is selected. If the user never selects a space and leaves, then the time escrowed will zero out after a specified time out period programmed in the software. When a switch is pressed then the meter will proceed to the switch handler.

If no switch is pressed and a card is inserted then the meter will alternate displaying "SEL" and "SPC" until a space is selected. No deductions from a parking card will be taken until a switch is pressed thereby selecting a bay or space.

If a switch is pressed, the meter processes the information in the multi bay switch handler. The bay or space is determined from the CPU and the appropriate bay is set active. If there is time escrowed, the meter will credit the time to an appropriate bay or space thereby updating the LCD display to the correct amount of time purchased and moving the optional two-bay flag wheel to the correct position indicated by the tables below. The meter sets the space as active for a specified time interval after the last coin is inserted showing the time purchased in that bay. After the time interval, the meter updates the display.

TABLE 1

TWO BAY FLAG WHEEL DISPLAY

| METER CON-DITION | FLAG WHEEL FRONT | FLAG WHEEL REAR | LCD DISPLAY | |
|---|---|---|---|---|
| Expired | Red-Red | Red | E | E |
| A timing, B expired | Green-Red | Red-Green | — | E |
| A expired, B timing | Red-Green | Green-Red | E | — |
| A timing, B timing | Green-Green | Green-Green | — | — |
| A active | Not updated | Not updated | Shows time on Space A | |
| B active | Not updated | Not updated | Shows time on Space B | |

TABLE 2

FOUR-BAY DIGITAL DISPLAY

| METER CONDITION | LCD DISPLAY | | | |
|---|---|---|---|---|
| Expired | E | E | E | E |
| A timing, B expired, C expired, D expired | — | E | E | E |
| A expired, B timing, C expired, D expired | E | — | E | E |
| A timing, B timing, C expired, D expired | — | — | E | E |
| A expired, B expired, C timing, D expired | E | E | — | E |
| A timing, B expired, C timing, D expired | — | E | — | E |
| A expired, B timing, C timing, D expired | E | — | — | E |
| A timing, B timing, C timing, D expired | — | — | — | E |
| A expired, B expired, C expired, D timing | E | E | E | — |
| A timing, B timing, C expired, D timing | — | — | E | — |
| A expired, B expired, C timing, D timing | E | E | — | — |
| A timing, B expired, C timing, D timing | — | E | — | — |
| A expired, B timing, C timing, D timing | E | — | — | — |
| A timing, B timing, C timing, D timing | — | — | — | — |
| A active | Shows time an Space A | | | |
| B active | Shows time on Space B | | | |
| C active | Shows time on Space C | | | |
| D active | Shows time on Space D | | | |

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A multi-bay parking meter comprising:

a rigid casing adapted to be disposed adjacent at least one parking space for which time is to be vended for housing components of said meter;

at least one payment slot in said casing for accepting payment for said time;

a plurality of space selection buttons for enabling a customer to choose a particular parking space, at least one button for each space;

a digital display for prompting a customer and indicating the status of parking spaces;

circuitry connected to place said meter in a low-power consumption mode when not vending time;

a circuit for crediting customers with payments and associating particular payments with particular parking spaces, said circuit activating said display for alerting a customer of his selection.

2. The multi-bay parking meter as defined in claim 1 wherein said circuit comprises an encoder for monitoring selected parking spaces, said encoder comprising circuitry to present an interrupt signal indicating that one of a plurality of parking spaces has received attention; and, to identify which one of a plurality of parking spaces has been selected by a customer.

3. A multi-bay parking meter, comprising:

a rigid casing adapted to be disposed adjacent at least one parking space for which time is to be vended for housing components of said meter;

at least one payment slot in said casing for accepting payment for said time;

a plurality of space selection buttons for enabling a customer to choose a particular parking space, at least one button for each space;

a digital display for prompting a customer indicating the status of parking spaces:

circuitry connected to place said meter in a low-power consumption mode when not vending time;

a circuit for crediting customers with payments and associating particular payments with particular parking spaces, said circuit activating said display for alerting a customer of his selection;

wherein said meter accommodates two parking spaces and comprises a flag wheel for separately indicating the sold-out status of both parking spaces independently of and concurrently with said digital display wherein said flag wheel comprises a rotary wheel comprising multiple colored segments that provide a sold-out indication at both the front and the rear of said meter.

4. A method of operating a multi-bay parking meter comprising the steps of:

providing a rigid casing adapted to disposed adjacent at least one parking space for which time is to be vended for housing components of said meter;

providing at least one payment slot means in said casing for accepting payment for said time;

providing a plurality of space selection buttons for enabling a customer to choose a particular parking space, at least one button for each space;

digitally displaying and indicating the status of parking spaces;

digitally prompting a customer; and crediting customers with payments and associating particular payments with particular parking spaces:

placing said meter in a low-power consumption mode when not vending time.

5. The method as defined in claim 4 including the step of separately indicating the sold-out status of parking spaces independently of and concurrently with said digital display step.

6. The method as defined in claim 5 wherein said step of separately indicating includes the step of rotating a rotary wheel comprising a front and back, said front and back comprising multiple colored segments that provide a sold-out indication at both the front and the rear of said meter.

7. The method as defined in claim 6 including the step of monitoring selected parking spaces, said monitoring step including the steps of:

presenting an interrupt signal indicating that one of a plurality of parking spaces has received attention; and, identifying which one of a plurality of parking spaces has been selected by a customer.

8. The method as defined in claim 7 wherein said monitoring step comprises the steps of:

establishing an idle loop for waiting for a coin, a debit card, or a parking switch input;

if a coin or payment card is inserted, displaying a "Select Space" prompt to urge the customer to choose a space by pressing an appropriate selection parking space selection button;

concurrently escrowing the dollar amount of payment inserted into said meter until a parking space is selected; and, crediting the customer with his purchase after a parking space is selected.

9. The method as defined in claim 8 including the step of establishing a switch handler routine, said switch handler routine comprising the steps of:

determining the selection of a particular parking space;

deciding whether coins or a payment card is inserted into said meter within a preselected time, and if no coins or payment card is inputted within said time, returning that space to inactive status.

10. The method as defined in claim 9 wherein said switch handler routine further comprises the steps of:

making the selected space active if any of the following events is determined within said time limit:
an escrow amount is present,
coins are inserted, or
a debit card is inserted;

vending the time to the appropriate selected parking space;

updating the display to indicate the selected parking space and the purchased time remaining.

11. The method as defined in claim 10 wherein said display step comprises the steps of providing information according to the following table, where A and B are the parking spaces for which the meter is vending time, "timing" and "expired" refer respectively to whether vended time remains for the cited parking spot or not, "red" and "green" are respective ones of said multiple colored segments, and the condition shown in the left-hand column causes the displays shown in the other three columns to be displayed on said front of said rotary wheel, said rear of said rotary wheel, and a digital display respectively:

| METER CON-DITION | FLAG WHEEL FRONT | FLAG WHEEL REAR | [LCD] DISPLAY | |
|---|---|---|---|---|
| Expired | Red-Red | Red | E | E |
| A timing, B expired | Green-Red | Red-Green | — | E |
| A expired, B timing | Red-Green | Green-Red | E | — |
| A timing, B timing, | Green-Green | Green-Green | — | — |

-continued

| METER CON-DITION | FLAG WHEEL FRONT | FLAG WHEEL REAR | [LCD] DISPLAY |
|---|---|---|---|
| A active | Not updated | Not updated | Shows time on space A |
| B active | Not updated | Not updated | Shows time on Space B |

12. The method as defined in claim 10 wherein said display step comprises the steps of providing information according to the following table, where A, B, C, and D refer to the parking spaces for which the meter is vending time, "timing" and "expired" refer respectively to whether vended time remains for the cited parking spot or not, and the condition shown in the left-hand column causes the displays shown in the other column to be digitally displayed:

| METER CONDITION | [LCD] DISPLAY | | | |
|---|---|---|---|---|
| Expired | E | E | E | E |
| A timing, B expired, C expired, D expired | — | E | E | E |
| A expired, B timing, C expired, D expired | E | — | E | E |
| A timing, B timing, C expired, D expired | — | — | E | E |
| A expired, B expired, C timing, D expired | E | E | — | E |
| A timing, B expired, C timing, D expired | — | E | — | E |
| A expired, B timing, C timing, D expired | E | — | — | E |
| A timing, B timing, C timing, D expired | — | — | — | E |
| A expired, B expired, C expired, D timing | E | E | E | — |
| [A timing, B timing, C expired, D timing | — | — | E | E] |
| A timing, B expired, C expired, D timing | — | E | E | — |
| A expired, B timing, C expired, D timing | E | — | E | — |
| A timing, B timing, C expired, D timing | — | — | E | — |
| A expired, B expired, C timing, D timing | E | E | — | — |
| A timing, B expired, C timing, D timing | — | E | — | — |
| A expired, B timing, C timing, D timing | E | — | — | — |
| A timing, B timing, C timing, D timing | — | — | — | — |
| A active | | Shows time on Space A | | |
| B active | | Shows time on Space B | | |
| C active | | Shows time on Space C | | |
| D active | | Shows time on Space D | | |

13. A multibay parking meter, comprising:

a rigid housing adapted to be mounted adjacent two or more parking spaces, said rigid housing comprising:

at least one opening in said housing through which payment may be inserted; and a plurality of buttons which indicate which of said two or more parking spaces is selected;

first detection circuitry to send an interrupt signal when one of said plurality of buttons is pushed;

second detection circuitry to send an interrupt signal when payment is received through said at least one opening;

payment circuitry, connected to said first and second detection circuitry, to accept payment through said at least one opening, to mark a selected parking space as active, and to credit said selected parking space with the payment;

idle circuitry, connected to said first and second detection circuitry and to said payment circuitry, to place at least said payment circuitry in an idle loop, which consumes less power, whenever an interrupt signal has not been received in a specified time period.

14. The multibay parking meter of claim 13, wherein said at least one opening comprises a slot to receive coins.

15. The multibay parking meter of claim 13, wherein said at least one opening comprises a slot to receive a payment card.

16. The multibay parking meter of claim 13, further comprising a display to continuously indicate the status of each space for which time may be vended.

17. The multibay parking meter of claim 13, further comprising a digital display to indicate, when a space has been selected, the time remaining for the selected space, and to indicate, at other times, the status (active or expired) of each of the spaces for which time may be vended.

18. A method of operating a multibay parking meter, comprising:

providing selection circuitry to receive a selection input specifying a parking space to which time is to be vended;

providing payment circuitry to receive a payment input for time to be vended;

maintaining said multibay parking meter in a normal mode when said selection circuitry or said payment circuitry has received a respective input within a predetermined time; and maintaining said multibay parking meter in a low-power mode at all other times.

19. The method of operating a multibay parking meter of claim 18, wherein said payment input is coins.

20. The method of operating a multibay parking meter of claim 18, wherein said payment input is a debit card.

*21. A multi-bay parking meter comprising:*

*a casing adapted to be disposed adjacent to at least one parking space for which time is to be vended;*

*a plurality of space selection switches, wherein a separate space selection switch corresponds to each parking space; and*

*circuitry enclosed in said casing and connected to receive information from said space selection switches and from a payment detection apparatus, and to drive a display accordingly;*

*wherein said circuitry has both an active mode and a low-power mode.*

*22. The parking meter of claim 21, wherein said casing is of metal.*

*23. The parking meter of claim 21, wherein said space selection switches are buttons.*

*24. The parking meter of claim 21, wherein said payment detection apparatus detects the insertion of coins.*

*25. A method of operating a multibay parking meter, comprising the steps of:*

*(a.) recognizing the selection of a parking space from a plurality of switches which each correspond to a respective parking space;*

*(b.) recognizing the receipt of payment for time to be vended;*

*(c.) operating said multibay parking meter in a normal mode or a low power mode in at least partial dependence on the occurrence of steps (a.) and (b.).*

*26. The method of claim 25, wherein said step (a.) comprises recognizing that a button corresponding to a parking space has been pushed.*

*27. The method of claim 25, wherein said step (b.) comprises recognizing that a debit card has been inserted into a slot in said multibay parking meter and accepting payment from said debit card.*

*28. The method of claim 25, wherein said step (b.) comprises recognizing that a coin has been inserted into a slot in said multibay parking meter.*

*29. The method of claim 25, wherein said step (c.) comprises maintaining said multibay parking meter in a low-power mode unless an interrupt signal, which indicates that step (a.) or step (b.) has occurred, has been received within a predetermined time period.*

* * * * *